(12) United States Patent
Maehara

(10) Patent No.: US 10,119,428 B2
(45) Date of Patent: Nov. 6, 2018

(54) ROLLER TYPE ROCKER ARM

(71) Applicant: Kabushiki Kaisha Riken, Tokyo (JP)

(72) Inventor: Mitsuhiro Maehara, Saitama (JP)

(73) Assignee: Kabushiki Kaisha Riken, Tokyo (JP)

( * ) Notice: Subject to any disclaimer, the term of this patent is extended or adjusted under 35 U.S.C. 154(b) by 36 days.

(21) Appl. No.: 15/306,053

(22) PCT Filed: Apr. 14, 2015

(86) PCT No.: PCT/JP2015/061488
§ 371 (c)(1),
(2) Date: Oct. 21, 2016

(87) PCT Pub. No.: WO2015/163198
PCT Pub. Date: Oct. 29, 2015

(65) Prior Publication Data
US 2017/0044936 A1 Feb. 16, 2017

(30) Foreign Application Priority Data

Apr. 24, 2014 (JP) ................. 2014-089859

(51) Int. Cl.
*F01L 1/18* (2006.01)
*F01L 1/053* (2006.01)

(52) U.S. Cl.
CPC ............... *F01L 1/185* (2013.01); *F01L 1/053* (2013.01); *F01L 1/18* (2013.01); *F01L 2001/0535* (2013.01); *F01L 2105/02* (2013.01)

(58) Field of Classification Search
CPC ... F01L 1/185; F01L 1/053; F01L 1/18; F01L 2001/0535; F01L 2105/02
See application file for complete search history.

(56) References Cited

U.S. PATENT DOCUMENTS 4,105,267 A 8/1978 Mori
5,159,852 A * 11/1992 Harimoto .................. F01L 1/14
74/559

FOREIGN PATENT DOCUMENTS

| GB | 1454385 | 11/1976 |
|---|---|---|
| JP | 49103037 A | 9/1974 |
| JP | 52113445 A | 9/1977 |
| JP | 62158218 U | 10/1987 |
| JP | 8291823 A | 11/1996 |
| JP | 2000034907 A | 2/2000 |
| JP | 2004225728 A | 8/2004 |
| JP | 2007023817 A | 2/2007 |
| JP | 2007263023 A | 10/2007 |
| JP | 2008255883 A | 10/2008 |
| JP | 2012241774 A | 12/2012 |

* cited by examiner

*Primary Examiner* — Zelalem Eshete
(74) *Attorney, Agent, or Firm* — Slater Matsil, LLP

(57) ABSTRACT

A roller-type rocker arm includes a roller shaft. A sliding surface of an outer circumference surface of the roller shaft includes a number of dimples. An inner ring roller is slidably attached to the outer circumference surface of the roller shaft. An inner circumference surface and an outer circumference surface of the inner ring roller include a number of dimples. An outer ring roller is slidably attached to the outer circumference surface of the inner ring roller. An inner circumference surface of the outer ring roller includes a number of dimples.

20 Claims, 12 Drawing Sheets

(A)

ROLLER TYPE ROCKER ARM

CROSS-REFERENCE TO RELATED APPLICATIONS

This patent application is a national phase filing under section 371 of PCT/JP2015/061488, filed Apr. 14, 2015, which claims the priority of Japanese patent application 2014-089859, filed Apr. 24, 2014, each of which is incorporated herein by reference in its entirety.

TECHNICAL FIELD

The present invention relates to a rocker arm-type valve mechanism for transmitting a rotary motion of a cam of an internal combustion engine.

BACKGROUND

For transmission of lift operation of a camshaft for opening/closing an intake and exhaust valve in a valve mechanism of four-stroke internal combustion engine, a tappet is used in a direct-hit type, and a rocker arm is used in a rocker arm type. The tappet or the rocker arm is provided between the camshaft and the intake and exhaust valve. When the valve is open, the tappet or the rocker arm is lifted while overcoming the reaction force of a valve spring. When the valve is closed, the tappet or the rocker arm is moved while pushed back by the valve spring, and the load from such spring force as well as the inertial force of the valve mechanism is constantly generated.

Recently, a rocker arm provided with a roller is widely employed for improved fuel efficiency. Such roller-type rocker arm includes four components in total, including a main body referred to as a body, an outer ring roller sliding with a camshaft, a shaft supporting the outer ring roller, and a small-diameter solid shaft referred to as a rolling element or a hollow roller referred to as an inner ring, which is between the shaft and the outer ring roller. The former using the rolling element is referred to as a rolling type, and the latter using the inner ring roller is referred to as a sliding type.

FIG. 1(A) shows a schematic perspective view of a sliding-type rocker arm, and FIG. 1(B) shows a schematic perspective view of a rolling-type rocker arm, with the body of the rocker arm omitted. A sliding-type rocker arm 10 includes a roller shaft 12, an inner ring roller 14 rotatably attached to the roller shaft 12, and an outer ring roller 16 rotatably attached to the outer surface of the inner ring roller 14. A rolling-type rocker arm 20 includes a roller shaft 22, a plurality of needle rollers 24 rotatably attached to the outer surface of the roller shaft 22, and a roller 26 a rotatably attached to the outer surface of the needle roller 24.

FIG. 2 shows an example diagram of a rolling-type rocker arm provided between a cam of a camshaft and a valve stem of an intake and exhaust valve. The rocker arm includes a body 30 holding rotatably a roller 26 as shown in FIG. 1(B), a first end 32 of the body 30 is supported by a pivot portion 34 and a second end 36 is abutted to a cap 38 of the valve stem of the intake and exhaust valve. The roller 26 is abutted to a cam 40, and the rotary motion of the cam 40 is transmitted to the body 30. Thus, according to the rotation of the cam 40, the second end 36 moves the intake and exhaust valve vertically. The sliding-type rocker arm is used in the same manner.

The rolling type has better friction performance compared to the sliding type because the rolling elements are rolling during operation. However, the rolling elements being slid are almost in line-contact with the shaft or the outer ring. Particularly, the rolling elements and the shaft have high contact pressure according to the Hertz's contact theory because the rolling elements have a small outer diameter which causes the contacts of both convex R to convex R.

In the sliding type, a lift load of a camshaft is supported by an inner circumference surface of an outer ring roller, an outer circumference surface of an inner ring roller, an inner circumference surface of the inner ring roller, and an outer circumference surface of a roller shaft. The inner ring roller and the roller shaft, which have the highest contact pressures, are used with lower contact pressure compared to rolling type because the inner ring roller has the wider inner diameter than the rolling element and thus the concave R to convex R contact is occurred for the roller shaft. Each sliding surface has a clearance and makes a relative motion while sliding. Then, the friction performance is de-graduated.

To improve fuel efficiency, there is a need to reduce the friction of the sliding portions. Also, to ensure the ability to smoothly transmit a lift operation for a long period, wear-resistance and scaffing-resistance are needed for the sliding portions. For such a conventional rocker arm, the techniques for suppressing wearing (see, JP2008-255883A) and for supplying lubricating oil efficiently (see, JP2007-023817A and JP2007-0263023A) have been disclosed. Further, the technique for avoiding damages or scaffings by providing lubricant film to a circumference surface of an inner ring roller (see, JP2000-034907A) has been disclosed.

SUMMARY

The present invention relate to a rocker arm-type valve mechanism for transmitting a rotary motion of a cam of an internal combustion engine. Particular embodiments relate to a roller-type rocker arm configuration with improved friction performance and scaffing resistance.

In a rocker arm of the sliding type, an inner surface of an outer ring roller, an outer surface of an inner ring roller, an inner surface of the inner ring roller, and an outer surface of a roller shaft respectively act as a sliding surface, and have a clearance. Conventionally, fabrication of such sliding surface is finished by adjusting surface roughness using barrel after polishing for shape creation.

During movement, splash lubrication using lubricating oil in a sprayed-form present in an atmosphere of a cylinder head is provided for lubricating to the sliding surfaces. Thus, a small amount of lubricating oil is originally provided. In addition, a side portion that is an inlet for supplying lubricating oil is covered with the body, which blocks and further reduces the supply of lubricating oil. This prevents the supply of a sufficient amount of lubricating oil and causes boundary lubrication. In the boundary lubrication, partial solid-solid contact is occurred, which makes it difficult to improve friction performance, wear-resistance, and scaffing-resistance.

To solve the above problems, the present invention intends to provide a rocker arm which can slides in a fluid lubrication area by effectively using lubricating oil present on the sliding surface.

In the present invention, a rocker arm, which is one component in rocker arm type valve mechanism of a 4-stroke internal combustion engine, is configured with four components in total, including a body, a roller shaft, and two rollers including an inner ring roller and an outer ring roller which are rotatably supported by the roller shaft. In such a rocker arm sliding in the sliding type, lubricating oil supplied in clearances between an outer circumference surface of an roller shaft and an inner circumference surface of an inner ring roller and between an outer circumference surface of the inner ring roller and an inner circumference surface of an outer ring roller is efficiently used to provide the fluid lubrication, thereby providing improved friction performance and scaffing resistance.

For the sliding surfaces of the roller shaft and the inner ring roller, a dimple-shaped oil reservoirs is provided in one or both of the outer circumferential surface of the roller shaft and the inner circumferential surface of the inner ring roller. For the sliding surfaces of the inner ring roller and the outer ring roller, a dimple-shaped oil reservoir is provided in one or both of the outer circumference surface of the inner ring roller and the inner circumference surface of the outer ring roller. Only one step is added to a conventional rocker arm fabrication because a dimple is provided after barrel finishing. In a preferred embodiment, the dimple may be ellipse-shaped or rectangular-shaped, in which the length may be not greater than 5 mm, the width may be not greater than 1 mm, and the depth may be not greater than 1 mm. The cross-section shape of the dimple may be constant in the sliding direction. The position of the dimple may be parallel or vertical to the sliding direction, and the pitch between the dimples may be constant or irregular.

Providing such dimple allows supplied lubricating oil to be remained. Therefore, lubricating oil is effectively used even though a small amount of lubricating oil is supplied, thereby transitioning from the conventional boundary lubrication to fluid lubrication.

According to the present invention, a plurality of grooves (dimples) are provided in one or both of the outer circumference surface of the roller shaft and the inner circumference surface of the inner ring roller and in one or both of the outer circumference surface of the inner ring roller and the inner circumference surface of the outer ring roller, which allows supplied lubricating oil to be remained in the dimple and thus improves friction performance and scaffing-resistance.

BRIEF DESCRIPTION OF DRAWINGS

FIG. 5, which includes FIG. 5(A) shows a perspective view of a roller shaft, FIG. 5(B) shows a perspective view of an inner ring roller, and FIG. 5(C) shows a perspective view of an outer ring roller.

FIG. 6, which includes FIG. 6(A) shows a perspective view and FIG. 6(B) shows a plan view therefor.

FIG. 7, which includes FIG. 7(A) shows a plan view and FIG. 7(B) shows a sectional view taken along X1-X1 in FIG. 6(B).

FIG. 8, which includes

FIG. 9, which includes

FIG. 10, which includes

FIG. 12, which includes FIG. 12(A) shows a sectional view of a configuration of a conventional outer circumference surface, FIG. 12(B) shows a sectional view of an outer circumference surface of an inner ring roller taken along X1-X1 in FIG. 11, FIG. 12(C) shows a schematic sectional view indicating clearances with lubricating oil supplied, and FIG. 12(D) shows a schematic sectional view of formation of fluid film.

DETAILED DESCRIPTION

Now, embodiments for implementing the present invention will be described in detail. It should be noted that the drawings are not necessarily to scale, with emphasis instead being placed upon illustrating components for clarity.

Figure 3:
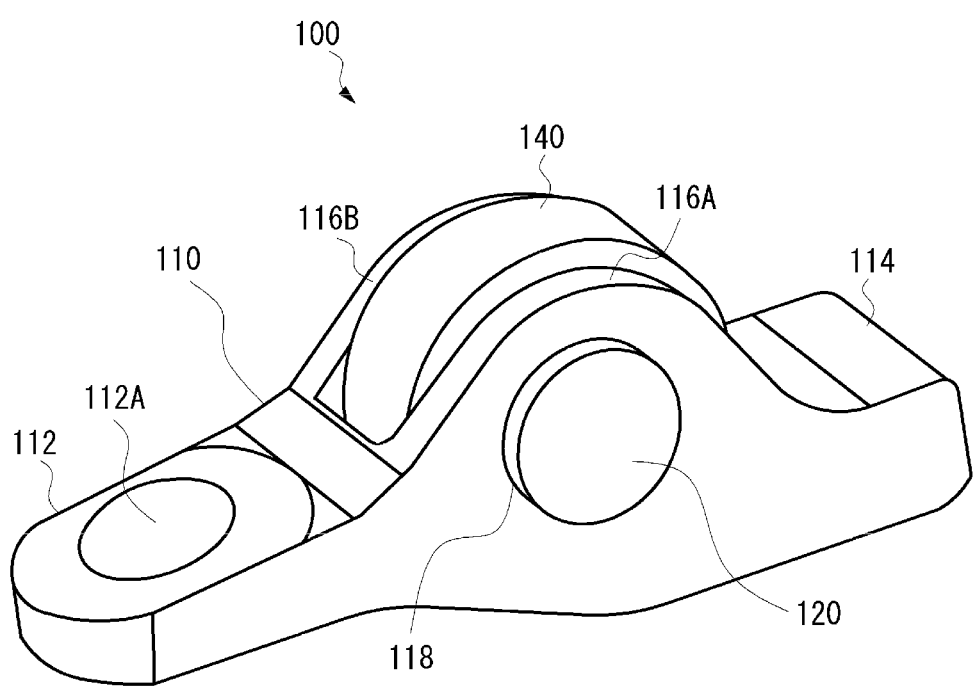
FIG. 3 shows a schematic external perspective view of a roller-type rocker arm according to an embodiment of the present invention.
Figure 4:
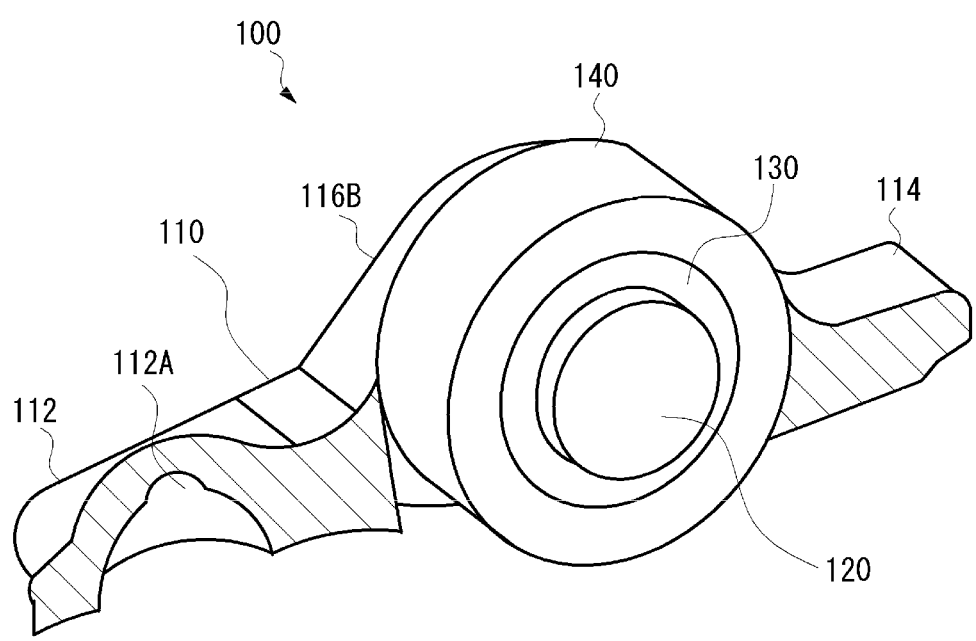
FIG. 4 shows a schematic diagram of a body of the rocker arm shown in FIG. 3, with a portion of the body eliminated.

FIG. 3 shows a perspective view of a whole rocker arm according to an embodiment of the present invention, FIG. 4 shows a partially cutaway view with the body of the rocker arm shown in FIG. 3 partially omitted, and FIG. 5 shows a perspective view of each component. A rocker arm according to an embodiment of the present invention is one component for a rocker arm-type valve mechanism of a 4-stroke internal combustion engine, which improves friction performance and scaffing resistance of a sliding rocker arm.

As shown in FIG. 3 and FIG. 4, a rocker arm 100 according to an embodiment includes a body 110, a roller shaft 120 fixed within the body 110, an inner ring roller 130 rotatably attached to the outer circumference of the roller shaft 120, and the outer ring roller 140 rotatably attached to the outer circumference of the inner ring roller 130.

Figure 1A:
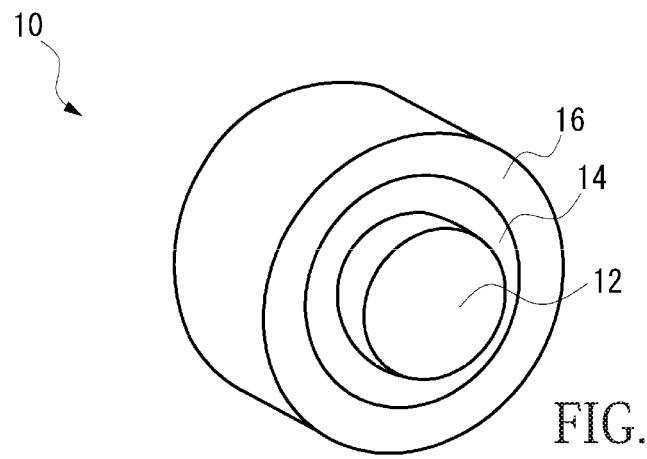
FIG. 1(A) shows a schematic perspective view of a conventional roller-type rocker arm (in a sliding type)
Figure 1B:
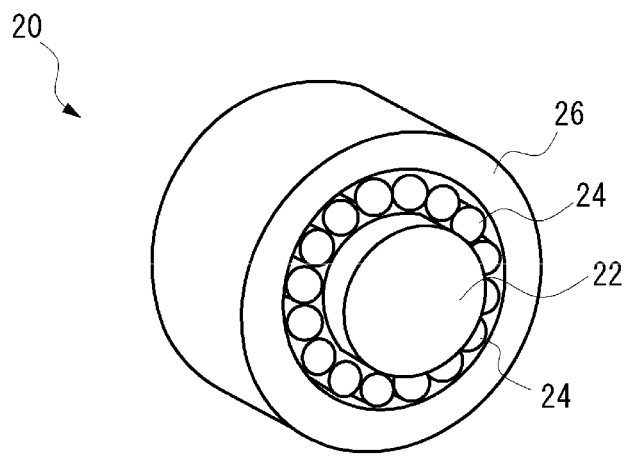
FIG. 1(B) shows a schematic perspective view of a conventional roller-type rocker arm (in a rolling type).
Figure 2:
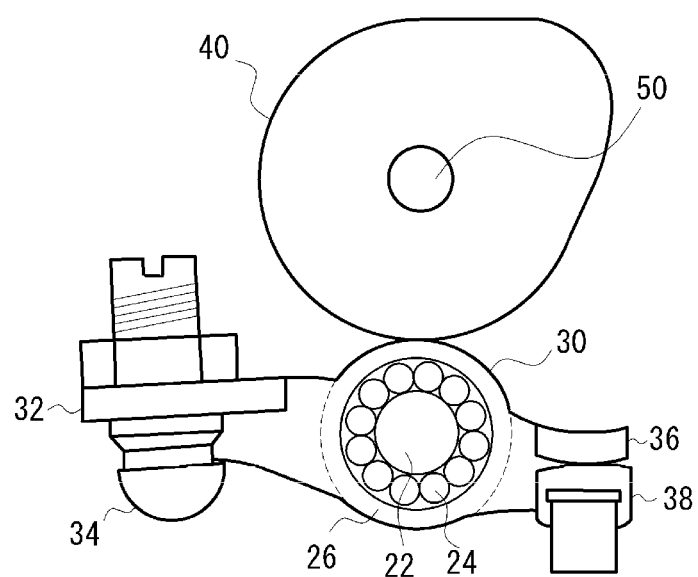
FIG. 2 shows an example diagram of a rocker arm operated by a cam.

The body 110 is a metal member for supporting the roller shaft 120, the inner ring roller 130 and the outer ring roller 140. An opening 112A is provided to support a pivot portion 34 (show in FIG. 2) at a first end 112, and a cap 38 of a valve stem of an intake and exhaust valve is abutted to a second end 114. A pair of spaced side walls 116A, 116B is provided between the first end 112 and the second end 114 of the body 110. A circular-shaped through holes 118 is provided on the pair of side walls 116A, 116B respectively. The roller shaft 120 is installed in the through holes 118 of the pair of side walls 116A, 116B.

Figure 5A:
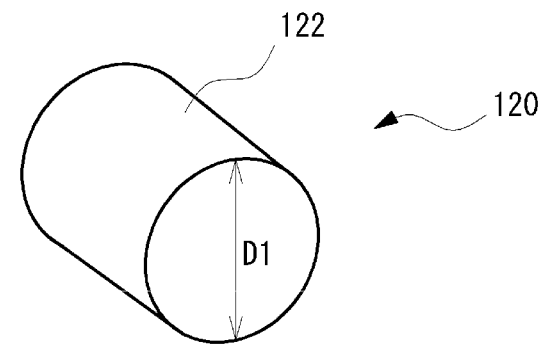
FIG. 5(A), FIG. 5(B) and FIG. 5(C), shows diagrams indicating each component of a rocker arm according to an embodiment of the present invention.

The roller shaft 120 is a metal member having a uniform diameter Di as shown in FIG. 5(A), and inserted into each through hole 118 of the pair of side walls 116A, 116B as the above-described. Preferably, the diameter Di of the roller shaft 120 is equal to or slightly greater than the diameter of the through holes 118. The roller shaft 120 is fastened within the through holes 118 by crimping, etc.

Figure 5B:
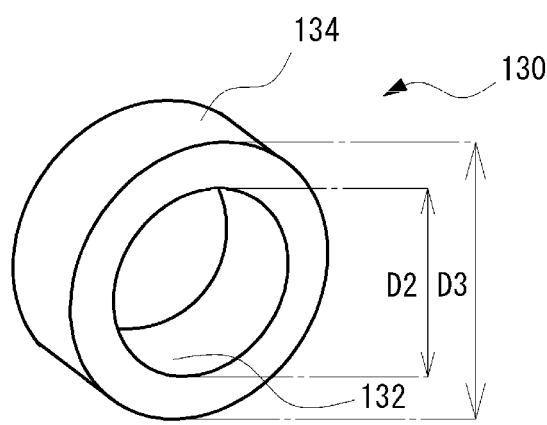

The inner ring roller 130 is an annular metal member installed to cover the outer circumference of the roller shaft 120 between the side walls 116A, 116B. As shown in FIG. 5(B), the inner ring roller 130 has an inner circumference surface 132 with an inner diameter D2 and an outer circumference surface 134 with an outer diameter D3. The inner diameter D2 is provided with a certain clearance S1 such that the inner diameter D2 is slightly greater than the diameter of the roller shaft 120, i.e., D2>D1. Thus, the inner circumference surface 132 of the inner ring roller 130 may be slid on the outer circumference surface 122 of the roller shaft 120.

Figure 5C:
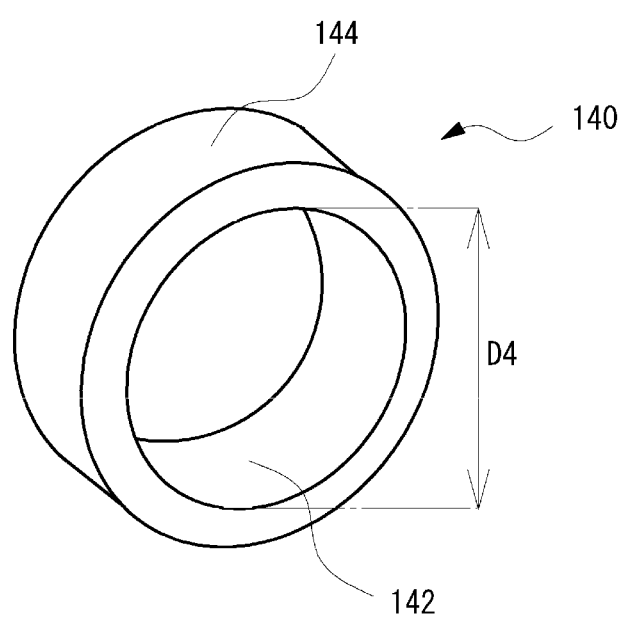

The outer ring roller 140 is an annular metal member installed to cover the outer circumference of the inner ring roller 130 between the side walls 116A, 116B. As shown in FIG. 5(C), the outer ring roller 140 has an inner circumference surface 142 with an inner diameter D4 and an outer circumference surface 144. The inner diameter D4 of the outer ring roller 140 is provided with a certain clearance S2 such that the inner diameter D4 is slightly greater than the outer diameter D3 of the inner ring roller 130, i.e., D4>D3. Thus, the inner circumference surface 142 of the outer ring roller 140 may be slid around the outer circumference surface 134 of the inner ring roller 130.

The feature of the rocker arm according to such embodiment is that grooves (i.e., dimples) are provided on at least one of sliding surfaces of the rocker arm components to reduce frictions and improve scaffing resistance. A plurality of dimples are provided on at least one of sliding surfaces of the outer circumference surface 122 of the roller shaft 120, the inner circumference surface 132 and the outer circumference surface 134 of the inner ring roller 130, and the inner circumference surface 142 of the outer ring roller 140, so that lubricating oil remained in oil reservoirs are effectively used even though there is a small amount of lubricating oil originally supplied. Also, the friction performance and the scaffing-resistance are improved due to the sliding surfaces sliding in the fluid lubrication area. In one preferred embodiment, for simple manufacturing, the dimples are provided in the outer circumference surface 122 of the roller shaft 120 for the sliding of the roller shaft 120 and the inner ring roller 130, while the dimples are provided in the outer circumference surface 134 of the inner ring roller 130 for the sliding of the inner ring roller 130 and the outer ring roller 140. The dimples are provide by transferring, etching, or laser processing, etc.

Figure 6A:
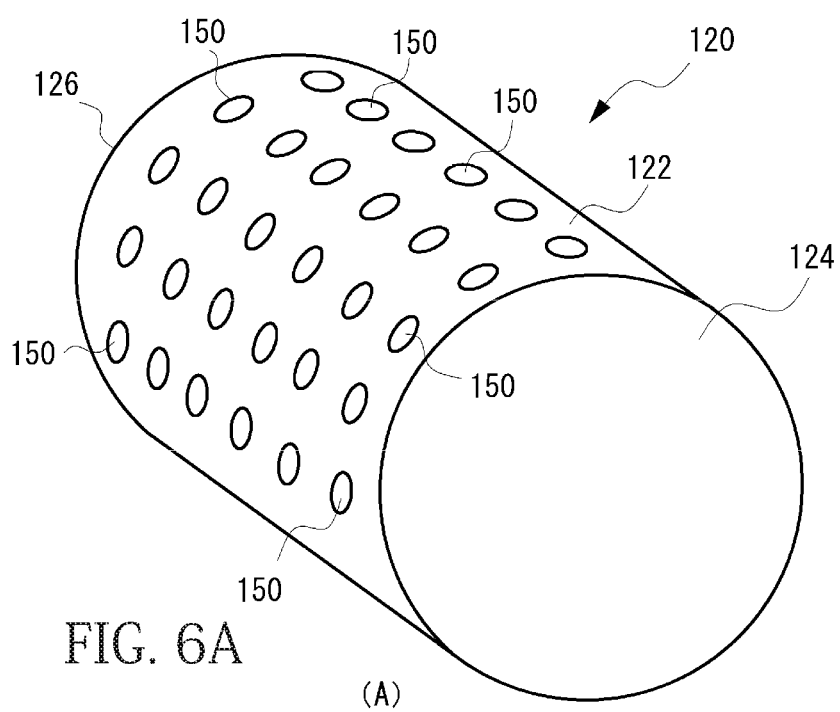
FIG. 6(A) and FIG. 6(B), shows an example diagram of dimples provided in an outer circumference surface of a roller shaft according to an embodiment of the present invention.
Figure 6B:
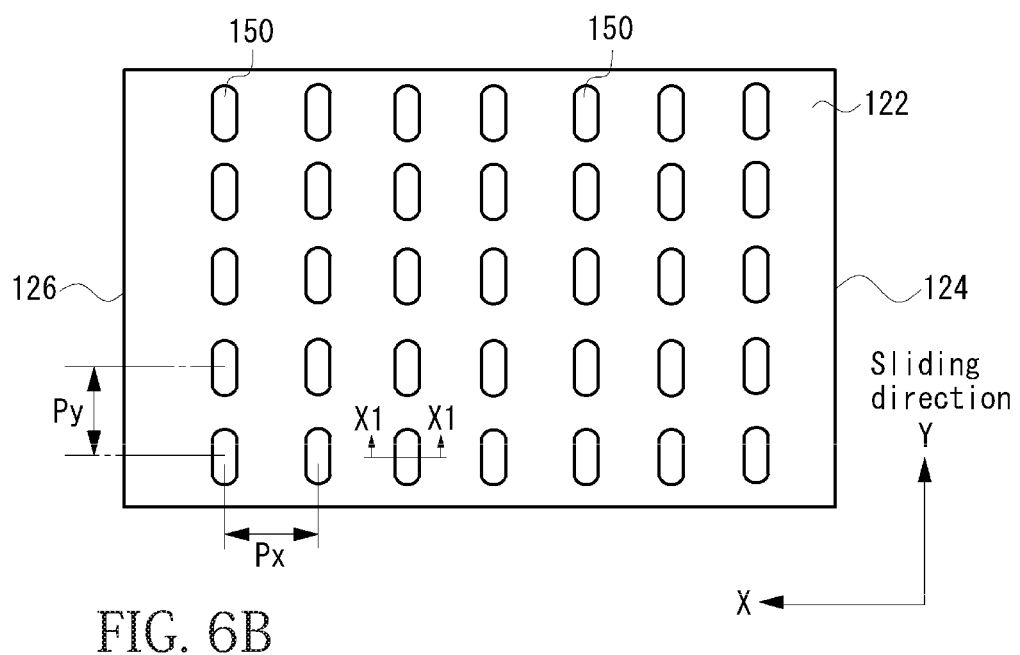

Now, FIG. 6 shows an example diagram of dimples 150 provided in the outer circumference surface 122 of the roller shaft 120. FIG. 6(A) shows a perspective view of the roller shaft and FIG. 6(B) shows a plan view thereof. The length defined by end surfaces 124, 126 of the roller shaft is at least equal to or greater than the width of the inner ring roller 130 in the axial direction.

Figure 7A:
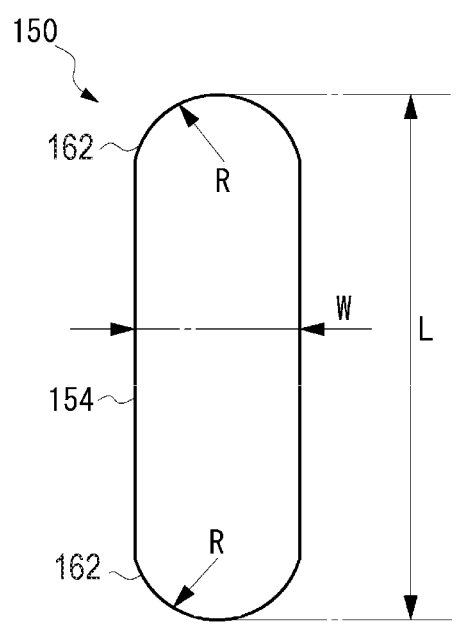
FIG. 7(A) and FIG. 7(B), shows a diagram of a dimple according to an embodiment of the present invention.
Figure 7B:
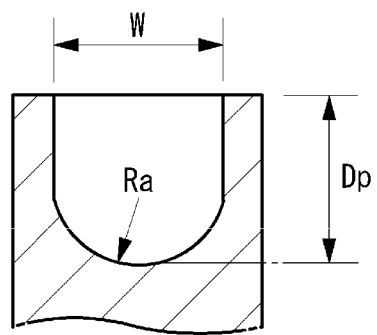

In a preferred embodiment, a plurality of dimples 150 are uniformly elliptical-shaped. FIG. 7(A) shows an enlarged plan view of a dimple. A planar-shape of one dimple 150 is almost elliptical-shaped, which has two ends 152 with the radius of curvature R and a connection portion 154 with a certain width W connecting the two ends 152. The length L in the major axial direction of the dimple 150 is, for example, 5 mm or less, and the width W is 1 mm or less. FIG. 7(B) shows a sectional view of a dimple taken along X1-X1 in FIG. 6(B). Preferably, the dimple 150 has the depth Dp from the bottom surface of the radius of curvature Ra. The depth Dp is, for example, 1 mm or less. The depth in the y-direction of the dimple 150 is formed uniformly in the same manner as the x-direction. The depth in the y-direction may be modified according to the rotational direction of the roller.

Such dimples 150 are formed in the outer circumference surface 122 of the roller shaft 120 such that they are aligned in the x and y directions and have uniform pitches Px, Py. Also, the dimples 150 are arranged such that the major axis thereof is parallel to the sliding direction. The pitches Px, Py in the x and y directions of the dimple are properly selected according to the size of the dimple (W, L, Dp).

The inner circumference surface 132 of the inner ring roller 130 sliding with the outer circumference surface 122 of the roller shaft 120 has a smoothed curved surface in which dimples are not necessarily provided. Forming the above-described dimples 150 uniformly and two-dimensionally in one side of the sliding surfaces keeps lubricating oil in the dimples 150. As a result, an oil film formed by the lubricating oil remained in the dimple 150 is uniformly and tow-dimensionally formed between the two sliding surfaces, and thus the sliding characteristics between the outer circumference surface 122 of the roller shaft 120 and the inner circumference surface 132 of the inner ring roller 130 is improved and the friction therebetween is reduced. In addition, the longitudinal direction of the dimple 150 is arranged along the sliding direction, which allows lubricating oil to be easily remained in the dimple 150 during sliding, thereby further improving the sliding characteristics.

Figure 8A:
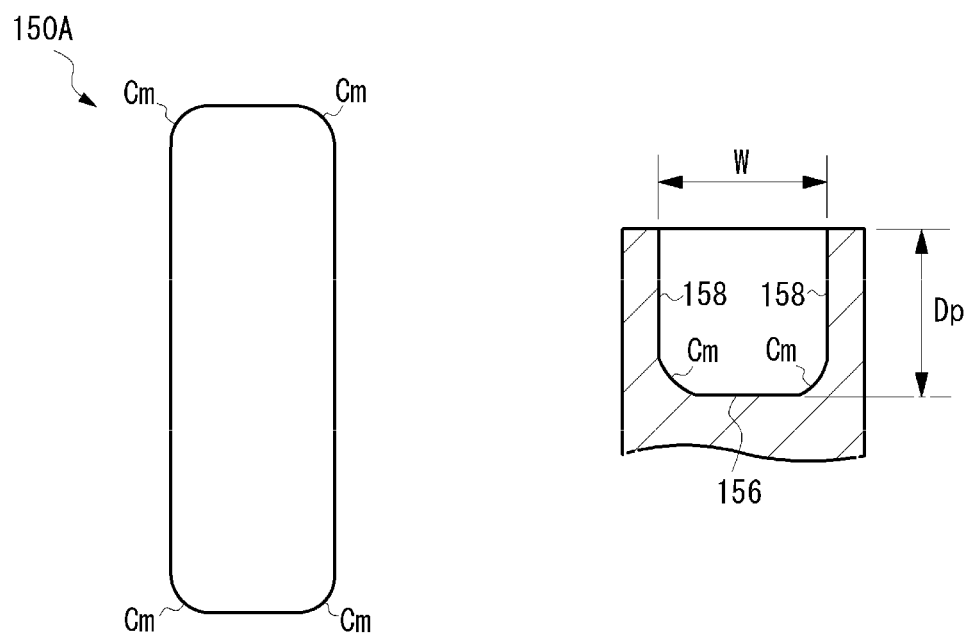
FIG. 8(A) and FIG. 8(B), shows a diagram indicating another configuration of a dimple according to an embodiment of the present invention.
Figure 8B:
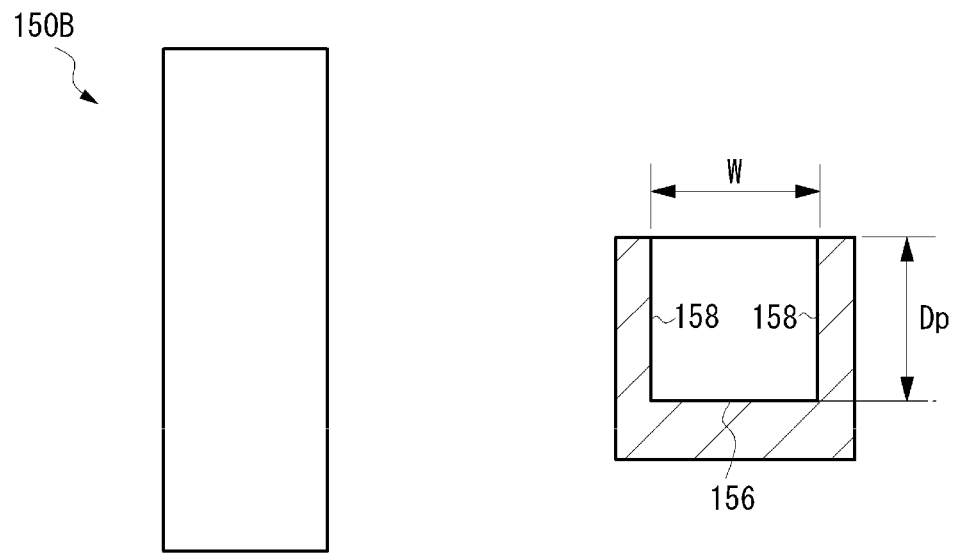

Now, an example of another-shaped dimple according to an embodiment is shown in FIGS. 8(A) and 8(B). The planar-shape of a dimple 150A shown in FIG. 8(A) is almost rectangular-shaped having four (4) corner portions formed with round chamfering Cm. The round chamfering Cm is also provided between the flat bottom surface 156 and the side surface 158 of the dimple 150A. The dimple 150B may be rectangular-shaped without round chamfering as shown in FIG. 8(B). Such dimples 150A, 150B may have the same effect as the dimple 150 shown in FIG. 7.

The planar-shape of the dimple is not limited to the above-described elliptical or rectangular. The planar-shape of the dimple may be anisotropic with a major axis and minor axis, or may be point symmetry or line symmetry circle or square, etc.

Figure 9A:
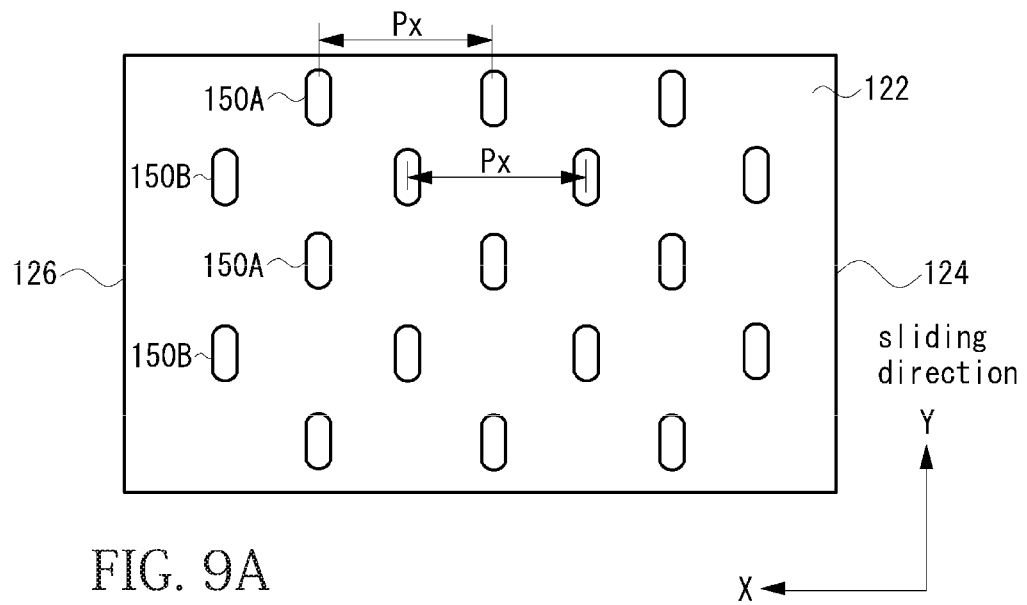
FIG. 9(A) and FIG. 9(B), shows a plan view indicating an example position of dimples according to an embodiment of the present invention.
Figure 9B:
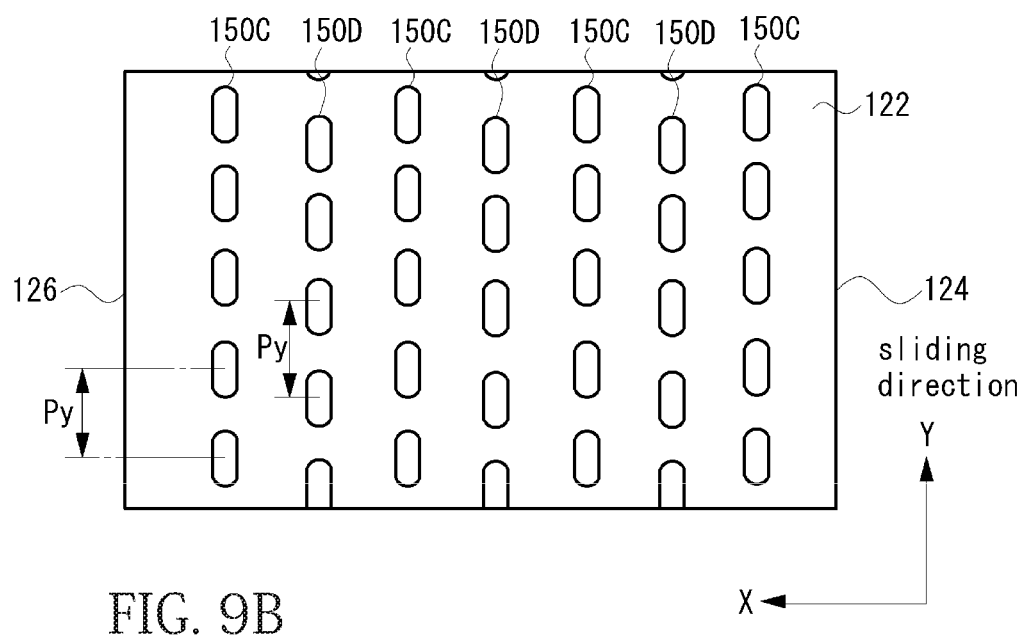

Now, another example arrangement of dimples will be described. The number and arrangement of dimples may be decided to provide the ability to form oil film sufficiently. FIG. 9(A) shows an aspect in which the number of dimple is reduced compared to FIG. 6(B). Considering the ability to form oil film effectively, the dimples are arranged in a staggered format in FIG. 9 (A). The pitch Px in the x direction of the dimple 150A in the odd-numbered rows is equal to the pitch Px in the x direction of dimple 150B in the even-numbered rows, while both pitches are shifted by one-half to one another. As the pitches (Py, Px) between the dimples are greater than that in the FIG. 6 (B), the depth of the dimple may be deeper than that in the FIG. 6 (B) to keep oil holding property. FIG. 9 (B) shows an example in which the pitch Py of the dimples 150C in the odd-numbered rows is shifted in the y direction by half pitch with respect to the pitch Py of the dimples 150D in the even-numbered rows.

Figure 10A:
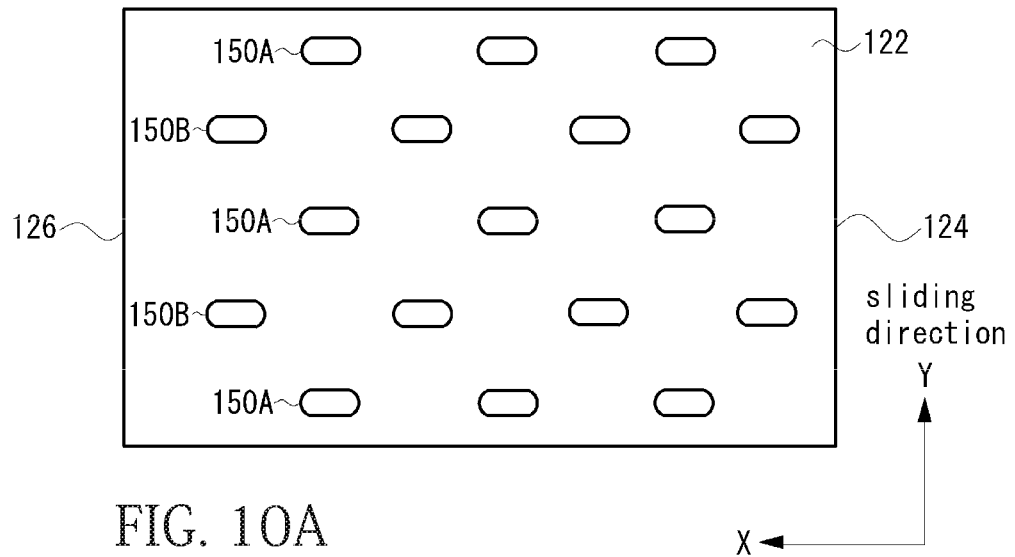
FIG. 10(A) and FIG. 10(B), shows a plan view indicating another example arrangement of dimples according to an embodiment of the present invention.
Figure 10B:
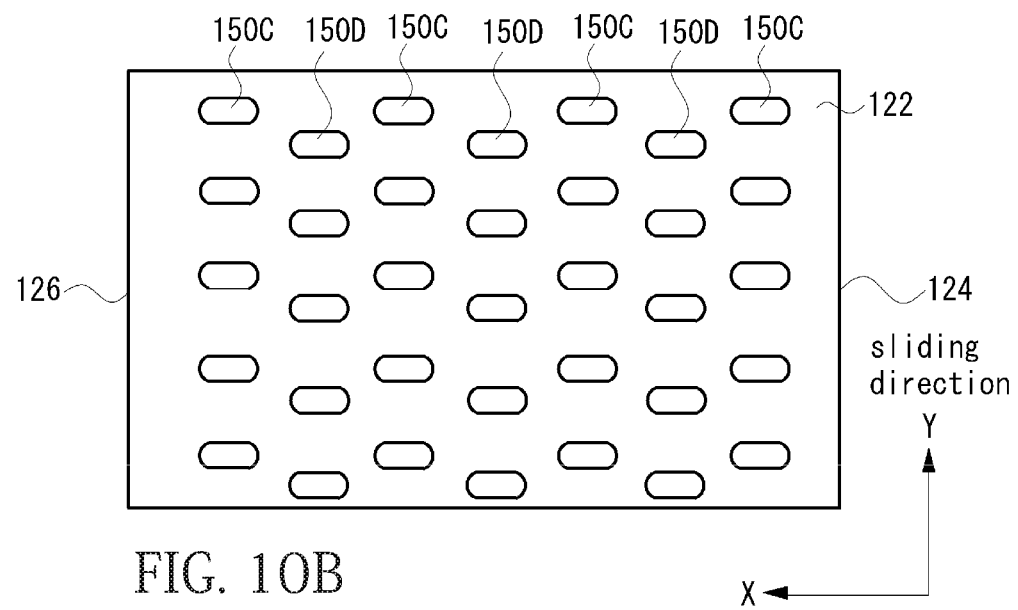

Now, another example arrangement of dimples according to an embodiment will be described. In the above-described example, the major axis direction of the dimples is arranged parallel to the sliding direction Y. In FIG. 10(A) and FIG. 10(B), the major axis of the dimples is arranged parallel to the direction X which is vertical to the sliding direction Y.

Such arrangement of the dimples may also reduce frictions between the sliding surfaces by the lubricating oil retained in the dimples.

Figure 11:
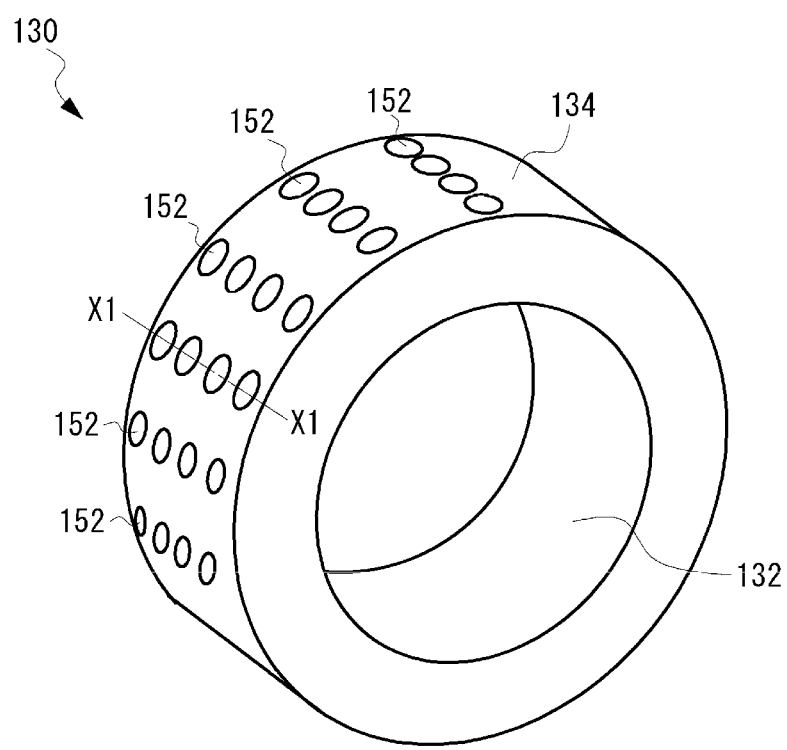
FIG. 11 shows an example perspective view with dimples provided in an outer circumference surface of an inner ring roller according an embodiment of the present invention.

FIG. 11 shows a perspective view of the inner ring roller 130 with dimples formed in the outer circumference surface 134 thereof. A plurality of dimples 152 are uniformly formed in the outer circumference surface 134. In this embodiment, a plurality of sets of linearly aligned dimples are arranged in the circumferential direction, which is just an example. The number, arrangement, shape (including cross section), size, and depth, etc. of the dimple 152 may be appropriately selected according to materials of the inner ring roller 130 and the outer ring roller 140, the inner diameter D2 and the outer diameter D3 of the inner ring roller, the inner diameter D4 of the outer ring roller, the area of the sliding surface, and a clearance S1, etc.

Operation of a roller-type rocker arm according to an embodiment will be described. During operation of engine, lubricating oil emitted from a camshaft journal or a HLA is presented in a splash form in a cylinder head. Such lubricating oil actively lubricates the outer ring roller 140 and the inner ring roller 130 of the rocker arm. By the continuous contact of the camshaft and the outer ring roller 140, the outer ring roller 140 is rotated constantly, and attached lubricating oil is drawn into the inside through the clearance so that the sliding surface is lubricated.

Figure 12A:
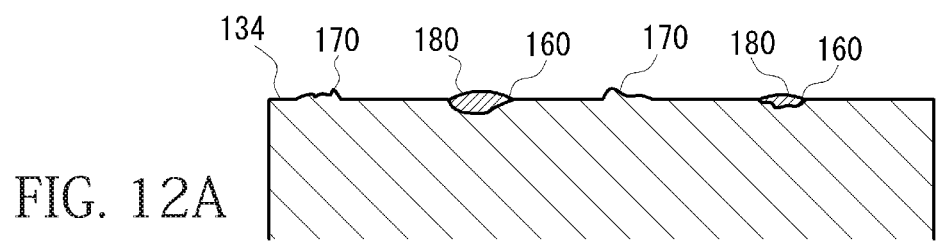
FIG. 12(A), FIG. 12(B), FIG. 12(C) and FIG. 12(D), shows a diagram indicating an effect of a sliding surface of an inner ring roller according to an embodiment of the present invention.
Figure 12B:
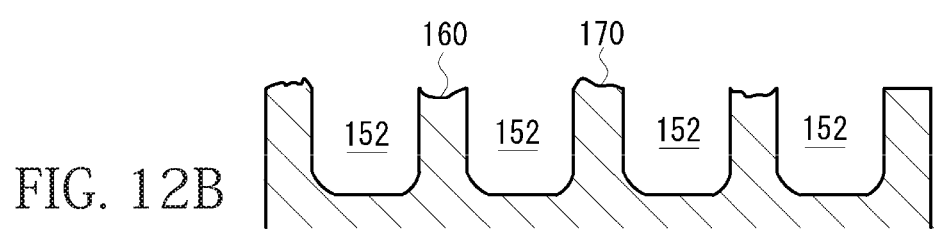

FIG. 12(A) is a schematic cross sectional view of an outer circumference surface of a conventional inner ring roller, and FIG. 12(B) is a schematic cross sectional view of the outer circumference surface 134 taken along the line X1-X1 in FIG. 11. As shown in FIG. 12(A), in conventional configuration, the dimples 152 are not provided in the outer circumference surface 134. Concave portions 160 and convex portion 170 are provided in the outer circumference surface 134 as a surface roughness formed by processing, so that the lubricating oil 180 drawn to the inside is retained only in the concave portions 160. As the concave portion 160 are not uniformly shaped in the outer circumference surface 134, the lubricating oil 180 is not uniformly retained in the outer circumference surface 134. Thus, the convex portions 170 contact directly with a mating component, thereby causing boundary lubrication. In addition, lubricating oil in a splash form is not sufficiently supplied and thus the sufficient thickness of a fluid film is not provided. Therefore, the friction performance and the scaffing-resistance are decreased.

Figure 12C:
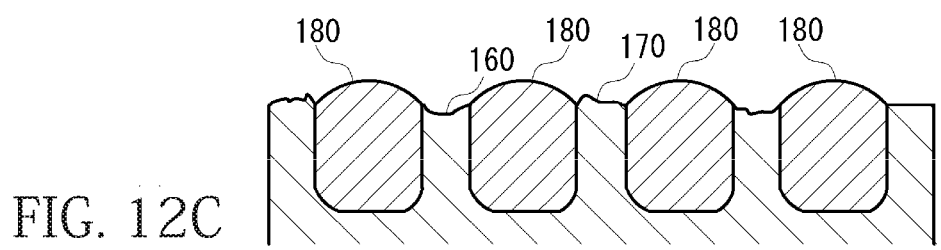
Figure 12D:
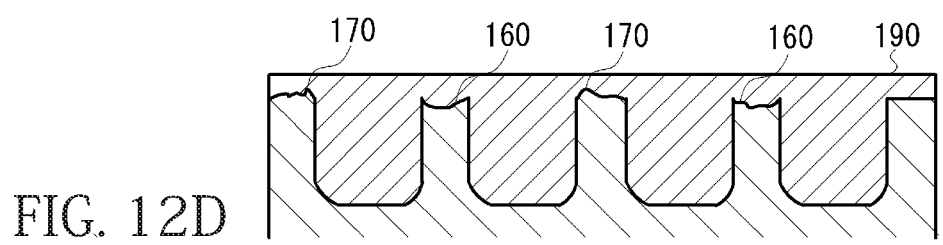

In this embodiment, as shown in FIG. 12(B), a plurality of dimples 152 are uniformly formed in the outer circumference surface 134, and thus the lubricating oil drawn to the inside through the clearance may be retained in the dimples 152 of the sliding surface as shown in FIG. 12(C). If the dimple 152 is deeper than the recess portions 160, more lubricating oil is retained. Therefore, even if a small amount of lubricating oil is supplied, the lubricating oil is constantly provided in the oil reservoir, because the lubricating oil is continuously supplied due to the splash lubrication during the operation of the engine and due to the continuous rotation of the outer ring roller. The oil reservoir has the depth which is greater than the total of the concave portions 160 and the convex portions 170 of the surface roughness. This allows a fluid film 190 with sufficient thickness to be formed as shown in FIG. 12(D).

Due to the continuous rotation of the outer ring roller 140, the fluid film 190 generates a wedge film effect which is obtained by the viscosity of the lubricating oil, thereby causing a fluid lubrication. On the other hand, for the roller shaft and the inner ring roller, the roller shaft is not rotated because it is fastened to the body. The inner ring roller 130 which is not locked may be freely rotated. The fluid film formed in a clearance between the inner ring roller 130 and the outer ring roller 140 has a friction caused by the viscosity resistance of the fluid property, and thus the rotation of the outer ring roller 140 may be transmitted to the inner ring roller 130. Accordingly, the similar effect is generated between the roller shaft and the inner ring roller, thereby improving the friction performance and the scaffing resistance.

By way of example, for manufacturing of the roller shaft 120, a hardened SUJ 2 (JIS G 4805) material was used, and the dimples 150 (shown in FIG. 6) having the length L, the width W, and the depth Dp as shown in Table 1 were formed by transmitting in the outer circumference surface 122. For manufacturing of the inner ring roller 130 and the outer ring roller 140, the hardened SUJ 2 (JIS G 4805) material was also used, and the dimples 150 having the length L, the width W, and the depth Dp as shown in Table 1 were formed by transmitting in the outer circumference surface 134 of the inner circumference roller 130. They were assembled to the body (not shown) so that a sliding-type roller rocker arm was provided. Also, using the same material as the above example, a conventional sliding-type roller rocker arm was provided for a comparative example, in which a roller shaft and an inner ring roller were formed without dimple.

The example product manufactured according to the above-manner and the comparative product were reviewed for their frictional resistance (friction) and scaffing resistance (scuffing resistance). The frictional resistance was measured by setting an actual engine installed with the example product according to the present inventions and the comparative product, to a motor bench connected to a dynamometer for measuring a friction loss of only valve mechanism, so as to rotate camshaft to measure driving torque. Measurement condition was that the number of rotation of camshaft was 300 rpm, the supply temperature of lubricating oil was 120°, and the lubricating oil was supplied only by a splash lubrication. Compared to the comparative product, the friction loss is shown by Δ which indicates around 3% improvement and by ○ which indicates more than 5% improvement. In the same manner as the friction loss measurement, the scaffing resistance was measured by setting a load-applicable unit test equipment installed with the example product according to the present invention and the comparative example, to a motor bench. Under the same condition as the friction loss evaluation, the amount of load applying to a rocker arm was constantly increased in a certain time, and the amount of load was measured until scuffs occurred. Compared to the scuff occurring load of the comparative product, the scaffing resistance performance is shown by Δ which indicates around 3% improvement and by ○ which indicates more than 5% improvement.

TABLE 1

|  | Length L (mm) | Width W (mm) | Depth Dp (mm) | abrasion resistance | seizure resistance |
|---|---|---|---|---|---|
| Example 1 | 1 | 0.5 | 0.2 | Δ | Δ |
| Example 2 | 1 | 1 | 1 | Δ | ○ |
| Example 3 | 3 | 0.5 | 0.5 | ○ | ○ |
| Example 4 | 3 | 1 | 1 | Δ | ○ |
| Example 5 | 5 | 0.5 | 0.5 | ○ | ○ |
| Example 6 | 5 | 1 | 1 | Δ | ○ |

The experimental result shows that the friction resistance and the scaffing resistance were improved by using the rocker arm according to an embodiment of the present invention, compared to the conventional rocker arm.

While the preferred embodiments according to the present invention were described above, the present invention is not limited to such specific embodiments. The present invention may be modified or changed without departing from the scope of the present invention according to the appended claims.

What is claimed is:

1. A roller-type rocker arm comprising:
   a roller shaft, wherein a sliding surface of an outer circumference surface of the roller shaft includes a plurality of dimples;
   an inner ring roller slidably attached to the outer circumference surface of the roller shaft, wherein an inner circumference surface and an outer circumference surface of the inner ring roller include a plurality of dimples; and
   an outer ring roller slidably attached to the outer circumference surface of the inner ring roller, wherein an inner circumference surface of the outer ring roller includes a plurality of dimples;
   wherein each dimple is anisotropic-shaped having a major axis and a minor axis, the plurality of dimples on each surface being separated in a sliding direction and in a directional orthogonal to the sliding direction.

2. The roller-type rocker arm according to claim 1, wherein the dimples are formed one side of the outer circumference surface of the roller shaft and the inner circumference surface of the inner ring roller, and wherein the dimples are formed on one side of the outer circumference surface of the inner ring roller and the inner circumference surface of the outer ring roller.

3. The roller-type rocker arm according to claim 1, wherein the dimples are formed two sides of the outer circumference surface of the roller shaft and the inner circumference surface of the inner ring roller, and wherein the dimples are formed on two sides of the outer circumference surface of the inner ring roller and the inner circumference surface of the outer ring roller.

4. The roller-type rocker arm according to claim 1, wherein the dimples are formed one side of the outer circumference surface of the roller shaft and the inner circumference surface of the inner ring roller, and wherein the dimples are formed on two sides of the outer circumference surface of the inner ring roller and the inner circumference surface of the outer ring roller.

5. The roller-type rocker arm according to claim 1, wherein the dimples are formed two sides of the outer circumference surface of the roller shaft and the inner circumference surface of the inner ring roller, and wherein the dimples are formed on one side of the outer circumference surface of the inner ring roller and the inner circumference surface of the outer ring roller.

6. The roller-type rocker arm according to claim 1, wherein the plurality of dimples are uniformly located on the outer circumference surface of the roller shaft.

7. The roller-type rocker arm according to claim 1, wherein the plurality of dimples are uniformly located on the inner circumference surface of the inner ring roller.

8. The roller-type rocker arm according to claim 1, wherein the plurality of dimples are uniformly located on the outer circumference surface of the inner ring roller.

9. The roller-type rocker arm according to claim 1, wherein the plurality of dimples are uniformly located on the inner circumference surface of the outer ring roller.

10. The roller-type rocker arm according to claim 1, a direction of the major axis of the dimple being parallel to a sliding direction of the sliding surface.

11. The roller-type rocker arm according to claim 10, wherein the dimple is less than 5 mm in length in the direction of the major axis, less than 1 mm in width in a direction of the minor axis, and less than 1 mm in depth.

12. The roller-type rocker arm according to claim 1, a direction of the major axis of the dimple being vertical to a sliding direction of the sliding surface.

13. The roller-type rocker arm according to claim 12, wherein each dimple is less than 5 mm in length in the direction of the major axis, less than 1 mm in width in a direction of the minor axis, and less than 1 mm in depth.

14. The roller-type rocker arm according to claim 1, wherein the roller-type rocker arm is configured to transmit a rotational motion of a cam to an intake and exhaust valve.

15. The roller-type rocker arm according to claim 1, wherein the dimple is less than 5 mm in length in the direction of the major axis, less than 1 mm in width in a direction of the minor axis, and less than 1 mm in depth.

16. An apparatus comprising:
    a cam of a camshaft;
    a valve stem of an intake and exhaust valve; and
    a rolling-type rocker arm between the cam and the valve stem, wherein the rolling-type rocker arm comprises:
      a roller shaft, wherein a sliding surface of an outer circumference surface of the roller shaft includes a plurality of dimples;
      an inner ring roller slidably attached to the outer circumference surface of the roller shaft, wherein an inner circumference surface and an outer circumference surface of the inner ring roller include a plurality of dimples; and
      an outer ring roller slidably attached to the outer circumference surface of the inner ring roller, wherein an inner circumference surface of the outer ring roller includes a plurality of dimples;
      wherein each dimple is anisotropic-shaped having a major axis and a minor axis, the plurality of dimples on each surface being separated in a sliding direction and in a directional orthogonal to the sliding direction.

17. The apparatus of claim 16, wherein the rocker arm includes a body, a first end of the body being supported by a pivot portion and a second end of the body being abutted to a cap of the valve stem of the intake and exhaust valve.

18. The apparatus of claim 16, wherein the outer ring roller is abutted to the cam.

19. The apparatus of claim 16, wherein the rocker arm includes a body, a first end of the body being supported by a pivot portion and a second end of the body being abutted to a cap of the valve stem of the intake and exhaust valve; and
    wherein the outer ring roller is abutted to the cam so that a rotary motion of the cam is transmitted to the body and, according to a rotation of the cam, the second end of the body moves the intake and exhaust valve vertically.

20. A roller-type rocker arm comprising:
    a roller shaft, wherein a sliding surface of an outer circumference surface of the roller shaft includes a plurality of dimples;
    an inner ring roller slidably attached to the outer circumference surface of the roller shaft, wherein an inner circumference surface and an outer circumference surface of the inner ring roller include a plurality of dimples; and an outer ring roller slidably attached to the outer circumference surface of the inner ring roller, wherein an inner circumference surface of the outer ring roller includes a plurality of dimples;

wherein the roller-type rocker arm is configured to transmit a rotational motion of a cam to an intake and exhaust valve;

wherein each dimple is anisotropic-shaped having a major axis and a minor axis, the plurality of dimples on each surface being separated in a sliding direction and in a directional orthogonal to the sliding direction; and wherein the dimple is less than 5 mm in length in the direction of the major axis, less than 1 mm in width in a direction of the minor axis, and less than 1 mm in depth.

* * * * *